United States Patent [19]

Gustison

[11] 4,164,417

[45] Aug. 14, 1979

[54] PROCESS FOR RECOVERY OF NIOBIUM VALUES FOR USE IN PREPARING NIOBIUM ALLOY PRODUCTS

[75] Inventor: Robert A. Gustison, Reading, Pa.

[73] Assignee: Kawecki Berylco Industries, Inc., Boyertown, Pa.

[21] Appl. No.: 901,069

[22] Filed: Apr. 28, 1978

[51] Int. Cl.² .................... C22B 34/24; C22C 27/02
[52] U.S. Cl. ........................................ 75/84; 75/27; 75/101 R; 75/174; 423/62; 423/63; 423/64; 423/65; 423/66; 423/472
[58] Field of Search ............... 423/62, 63, 64, 65, 423/66, 472; 75/84, 27, 174, 101 R

[56] References Cited

U.S. PATENT DOCUMENTS

| | | | |
|---|---|---|---|
| 2,905,548 | 9/1959 | Taylor et al. | 75/27 |
| 2,953,453 | 9/1960 | Foos | 423/66 |
| 3,523,128 | 8/1970 | Bielecki et al. | 75/84 |
| 3,597,192 | 8/1971 | Wilhelm et al. | 75/84 |
| 3,712,939 | 1/1973 | Capps et al. | 423/63 |

*Primary Examiner*—Brooks H. Hunt
*Attorney, Agent, or Firm*—Pennie & Edmonds

[57] ABSTRACT

The invention disclosed provides a process for recovering niobium values from aqueous hydrofluoric acid solutions by evaporating said solution to dryness and baking the residue at temperatures of 150° to 250° C. The solid residue is niobium oxyfluroide ($NbO_2F$) which may then be exothermically reduced with aluminum in the presence of an alloying element such as iron, nickel, or chromium to produce a niobium alloy. The evaporated hydrofluoric acid may be recovered by condensing or absorbing the evolved vapors.

10 Claims, No Drawings

PROCESS FOR RECOVERY OF NIOBIUM VALUES FOR USE IN PREPARING NIOBIUM ALLOY PRODUCTS

FIELD OF THE INVENTION

The present invention relates to a process for the aluminothermic reduction of niobium oxyfluoride in the presence of an alloying metal powder. The niobium oxyfluoride is prepared by evaporating a hydrofluoric acid solution of niobium to dryness and baking at 150° C. or greater.

BACKGROUND OF THE INVENTION

This invention relates to the treatment of aqueous hydrofluoric acid solutions of niobium emanating from the liquid-liquid extraction and purification of niobium.

The usual purification and recovery of niobium from its ores involves taking the ore into hydrofluoric acid solution and separating the niobium from tantalum and gangue materials by its differential solubility in organic extractants such as methyl-isobutyl-ketone, di-alkyl-phosphate, tributyl-phosphate, trioctyl-amine and the like. The niobium fluoride loaded organic phase is then contacted with water whereby the niobium values are preferentially soluble in the aqueous phase. This aqueous niobium fluoride solution is then treated with ammonia to precipitate the niobium as the hydroxide along with chemisorbed ammonium fluoride. This slurry is then filtered thus separating the ammonium fluoride solution from the precipitated niobium hydroxide. The niobium hydroxide filter cake is then dried and calcined at 875° to 1000° C. to remove moisture and absorbed ammonium fluoride. The ammonium fluoride solutions create a waste disposal problem and must be treated with lime to react with the ammonium fluoride according to the reaction:

$$2NH_4F + CaO \rightarrow CaF_2 + 2NH_3 + H_2O \qquad (I)$$

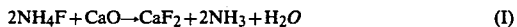

Generally, this reaction takes place in an ammonia stripping column whereby the released ammonia is recovered in the overhead fraction.

The calcined $Nb_2O_5$ can then be alumino-thermically reduced in the presence of an alloying element such as iron, nickel, or chromium to produce a vacuum-grade niobium-containing alloy.

It has now been found that by recovering niobium values from aqueous hydrofluoric acid strip solutions which are evaporated to dryness following which the residue is baked at a temperature from about 150° C. to 250° C., niobium oxyfluoride ($NbO_2F$) is recovered which can be alumino-thermically reduced to a vacuum-grade alloy. The process is performed in a simple efficient manner and avoids numerous disadvantages of the prior art. In addition, about 1.5 pounds hydrogen fluoride per pound of niobium is recovered in the process.

DETAILED DESCRIPTION OF THE PREFERRED EMBODIMENTS

Practice of the present invention provides an effective means by which niobium alloys may be produced by alumino-thermic reduction of niobium oxyfluoride, $NbO_2F$, which may be prepared by evaporating a hydrofluoric acid solution containing niobium values to dryness following which the dried residue is baked for conversion to niobium oxyfluoride. Alternatively, niobium oxyfluoride may be converted to niobium pentoxide, $Nb_2O_5$, by calcining in the presence of water vapor.

In an embodiment of this invention, there is disclosed the treatment of aqueous hydrofluoric acid solutions of niobium emanating from the liquid-liquid extraction and purification of niobium.

It has now been found that by the present invention there is provided a method of recovering the niobium values from an aqueous niobium fluoride solution and at the same time recovering the hydrofluoric acid values from the solution. The process involves evaporating an aqueous solution of niobium fluoride from its initial concentration of about 70 to 140 grams of niobium per liter to about 350 to 700 grams of niobium per liter in a closed evaporator attached to a condenser to recover the vapors emanating from the evaporation. The condensed vapors normally contain about 8 to 12% by weight hydrofluoric acid. The concentrated niobium fluoride solution is then placed in a suitable tray, for example, nickel, and evaporated to dryness at a temperature greater than 150° C. The vapors from this evaporation are also recovered as an approximate 50% by weight hydrofluoric acid solution. The residue cake that remains in the tray is niobium oxyfluoride ($NbO_2F$). The recovered niobium oxyfluoride can be calcined in the presence of water vapor at about 500° to 1000° C. to form niobium pentoxide ($Nb_2O_5$) by the following reaction:

$$2NbO_2F + H_2O \rightarrow Nb_2O_5 + 2HF \qquad (II)$$

An advantage of this process is that silicon and antimony, common impurities in niobium pentoxide produced in the customary way, are removed.

Vacuum grade ferro-, nickel-, or chromium-niobium are customarily produced from high purity niobium pentoxide ($Nb_2O_5$) which has been made by ammonia precipitation of a high purity niobium fluoride solution. The precipitate is filtered, washed, dried and calcined at about 1000° C. The calcined niobium pentoxide is then mixed with aluminum powder and either iron, chromium or nickel powder, lime or fluorspar for fluxing and sodium chlorate as a heat booster. This mixture is ignited in a suitable container to produce the desired alloy by the alumino-thermic reaction:

$$3Cb_2O_5 + 10Al \rightarrow 6Cb + 5Al_2O_3 \qquad (III)$$

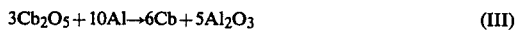

Now, however, it has been found that niobium oxyfluoride ($NbO_2F$) can be used in place of niobium pentoxide for the alumino-thermic production of niobium alloys. The niobium oxyfluoride can be produced without the high temperature calcination step which is a source of contamination of the high purity niobium pentoxide. The fluorine content of the niobium oxyfluoride passes into the slag where it acts as an efficient flux and assists in metal collection during the reduction step. In addition, the aluminum reduction of niobium oxyfluoride generates more exothermicity than the reduction of niobium pentoxide resulting in the elimination of a chemical heat booster such as sodium chlorate. The addition of lime (CaO) or the like in sufficient quantity to react approximately stoichiometrically with the fluorine in the niobium oxyfluoride ($NbO_2F$) is desirable and is found necessary. Without the lime addition, aluminum fluorides would be volatilized thus agitating the molten system and, at the same time, removing heat and leaving a high melting point slag, $Al_2O_3$.

The overall reaction for the reduction of niobium oxyfluoride with aluminum in the presence of lime follows:

$$6NbO_2F + 10Al + 3CaO \rightarrow 6Nb + 5Al_2O_3 + 3CaF_2 \quad (IV)$$

The reaction probably takes place in two steps:

$$6NbO_2F + 10Al \rightarrow 6Nb + 4Al_2O_3 + 2AlF_3 \quad (V)$$

$$\Delta F_{2000} = -468 Kcal.$$

and $$2AlF_3 + 3CaO \rightarrow Al_2O_3 + 3CaF_2 \quad (VI)$$

$$\Delta F_{2000} = -114 Kcal.$$

$$\Delta F_{2000}(Overall) = -582 Kcal.$$

which can be contrasted to the $Nb_2O_5$ reaction:

$$3Nb_2O_5 + 10Al \rightarrow 6Nb + 5Al_2O_3 \quad (VII)$$

$$\Delta F_{2000} = -450 Kcal.$$

Thus, it can be seen that at thermite reaction temperatures the free energy of reaction is about 29% greater for the $NbO_2F$ system than the $Nb_2O_5$ system.

Of course, other oxides capable of reacting with aluminum fluoride at thermite temperatures can also be used in place of calcium oxide. The list includes materials such as strontium oxide, barium oxide, magnesium oxide, and lithium oxide as follows:

$$2AlF_3 + 3SrO \rightarrow Al_2O_3 + 3SrF_2 \quad (VIII)$$

$$\Delta F_{2000} = -150 Kcal.$$

$$2AlF_3 + 3BaO \rightarrow Al_2O_3 + 3BaF_2 \quad (IX)$$

$$\Delta F_{2000} = -156 Kcal.$$

$$2AlF_3 + 3MgO \rightarrow Al_2O_3 \cdot 3MgF_2 \quad (X)$$

$$\Delta F_{2000} = -69 Kcal.$$

$$2AlF_3 + 3Li_2O \rightarrow Al_2O_3 + 6LiF \quad (XI)$$

$$\Delta F_{2000} = -177 Kcal.$$

Typically, the reactions proceed using stoichiometrical amounts of reactants, and preferably a slight excess of the oxides.

Thus, by the present process alloys such as ferro-niobium, nickel-niobium, or chromium-niobium can be effectively prepared by the alumino-thermic reduction of niobium oxyfluoride, without the use of a chemical or thermal heat booster.

The following examples illustrate practice of the present invention in greater detail. In the examples, as well as in this specification generally, all parts and percentages are given by weight unless indicated otherwise.

Example 1

A solution of niobium fluoride emanating from the liquid-liquid extraction of niobium was found to contain:

| | | |
|---|---|---|
| Nb | = | 134.8 grams/liter |
| HF | = | 238 grams/liter |

-continued

| | | |
|---|---|---|
| $F^-$/Nb Mole Ratio | = | 8.2 |
| Antimony | = | 550 ppm (Sb/Nb Basis) |
| Silicon | = | 1200 ppm (Si/Nb Basis) |

About 3,100 gallons of this solution was evaporated to 893 gallons. The boiling point at the end of evaporation was 122° C. The concentrated niobium solution was found to contain:

| | | | |
|---|---|---|---|
| Nb | = | 468 | grams/liter |
| HF | = | 625 | grams/liter |
| $F^-$/Cb Mole Ratio | = | 6.2 | |

The condensed vapors from the evaporation were collected. The condensate consisted of 70 gallons of methylisobutylketone plus 2,400 gallons of hydrofluoric acid solution containing 75 grams/liter HF. This amounts to a recovery of 0.43 lbs. 100% HF per pound of niobium in the original solution.

The concentrated niobium-bearing solution was found to be stable with no crystallization or precipitation of solids on prolonged storage at ambient conditions. A number of niobium-bearing solutions were evaporated to test the recovery of hydrofluoric acid and methylisobutylketone under varying concentrations of niobium. These are reported in Table I.

TABLE I
CONCENTRATION OF NIOBIUM-BEARING SOLUTIONS

| RUN NO. | 1 | 2 | 3 | 4 | 5 |
|---|---|---|---|---|---|
| Nb-Solution | | | | | |
| Nb (gm/l.) | 103.5 | 123 | 134 | 147 | 163 |
| HF (gm/l.) | 223.5 | 227 | 237 | 252 | 263 |
| F/Cb Mole Ratio | 10 | 8.55 | 8.2 | 7.95 | 7.52 |
| Condensate Evaporated | | | | | |
| (% by Wt.) | 77.5 | 81.7 | 78.5 | 79.2 | 75.5 |
| HF (gm/l.) | 92.4 | 109.5 | 118 | 116 | 99.5 |
| HF/Nb (lb/lb) | 0.68 | 0.71 | 0.67 | 0.61 | 0.45 |
| MIBK/Nb (lb/lb) | 0.17 | 0.10 | 0.12 | 0.09 | 0.08 |
| Conc. Cb-Solution | | | | | |
| Nb (gm/l.) | 460 | 668 | 625 | 756 | 665 |
| HF (gm/l.) | 680 | 757 | 682 | 735 | 772 |
| F/Cb Mole Ratio | 6.85 | 5.27 | 5.06 | 4.5 | 5.4 |

The concentrated niobium-bearing solution was then evaporated to dryness in a nickel tray contained in a carbon-lined externally heated oven maintained at 232° C. The resulting dry product was identified by X-ray diffraction to be $NbO_2F$. Analysis of the product was:

| Ingredient | Percent by Weight | Impurity | ppm |
|---|---|---|---|
| Nb = | 61.95 | Sb | = 183(Sb/Cb) |
| $F^-$ = | 13.8 | Si | = >100 |

As can be seen, about 64% by weight of the antimony and greater than 90% of the silicon were removed by the evaporation step. The evaporated vapors from the oven varied during the course of the evaporation from about 15% HF to greater than 90% HF at the end. Because of this variation in HF concentration, the use of a contact condenser to recover the HF is impractical. A Venturi-type scrubber which can quench and condense the evolved vapors is preferred although an absorption tower could also be used. The recovered HF solution averages about 50% HF.

An example of the above data is shown in a typical process flow sheet, shown in the drawing. Thus, 2,057 gallons of niobium solution having 140 gram/liter of Nb values and 240 grams/liter of HF are evaporated, the overhead condensate being composed of 41 gallons MIBK and about 1400 gallons of HF solution. The concentrate Nb solution is 588 gallons which is baked in an oven to yield 3717 pounds of $NbO_2F$. Vapors recovered from a Venturi scrubber yield 2577 pounds HF and 2696 pounds of water, i.e., approximately 49% by weight HF solution.

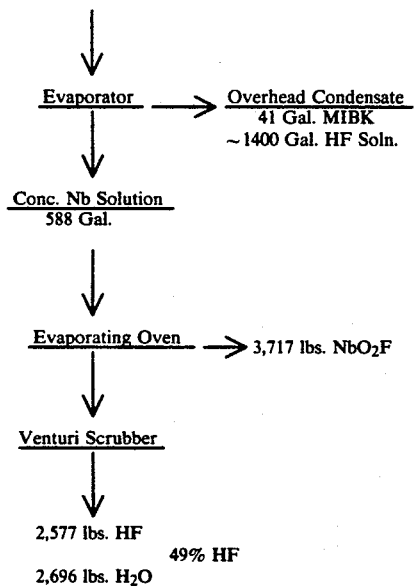

PROCESS FLOW SHEET

EXAMPLE 2

A number of evaporations to dryness were made to determine the temperature required for optimum conversion to $NbO_2F$. These results are shown in Table II. The data show a lower fluorine content in the $NbO_2F$ with increasing temperature. For this set of experiments a contact condenser was used to recover the HF solution and an indeterminant amount of HF was lost to the atmosphere. If the $NbO_2F$ product is to be calcined to $Nb_2O_5$, an even lower temperature can be used. For example, in one experiment at 125° C. the product contained 15.8% F. but also still contained water which, of course, would be removed by calcination. The absorbed water would, however, be counter-productive if the $NbO_2F$ were to be used directly in aluminothermic reactions.

TABLE II
EVAPORATION OF CONCENTRATED COLUMBIUM-BEARING SOLUTIONS

| | RUN NO. | | | |
|---|---|---|---|---|
| | 1 | 2 | 3 | 4 |
| Evaporation Temp. °C. | 204 | 218 | 232 | 232 |
| Charge | | | | |
| Gallons | 4.5 | 4.63 | 4.5 | 6.75 |
| Pounds | 66.4 | 66.0 | 63.5 | 93.3 |
| Pounds Niobium | 19.4 | 18.2 | 17.1 | 24.6 |
| Pounds HF | 25.1 | 23.4 | 21.6 | 28.7 |

TABLE II-continued
EVAPORATION OF CONCENTRATED COLUMBIUM-BEARING SOLUTIONS

| | RUN NO. | | | |
|---|---|---|---|---|
| | 1 | 2 | 3 | 4 |
| Condensate | | | | |
| Gallons | 2.98 | 3.42 | 3.29 | 4.67 |
| Pounds | 29.3 | 33.0 | 31.5 | 45.2 |
| Pounds HF | 14.7 | 14.7 | 12.2 | 18.7 |
| Pounds HF/Pound Nb | 0.76 | 0.81 | 0.71 | 0.76 |
| HF Concentration, % by Wt. | 50.2 | 44.3 | 38.8 | 41.3 |
| Solid Residue | | | | |
| Pounds | 30.6 | 30.3 | 29.0 | 41.6 |
| $F^-$(% by Wt.) | 15.9 | 15.04 | 10.23 | 11.41 |
| Niobium (% by Wt.) | 61.6 | 64.3 | 62.3 | 62.1 |
| X-Ray Identification | $CbO_2F$ | $CbO_2F$ | $CbO_2F$ | $CbO_2F$ |

EXAMPLE 3

A number of corrosion tests were made to determine acceptable tray materials. In general, nickel and nickel-containing alloys such as Monel and Hastelloy A, B, and C were found to be satisfactory.

A portion of the $NbO_2F$ were calcined at 1000° C. in the presence of water vapor and was converted to $Nb_2O_5$ according to the reaction:

$$2NbO_2F + H_2O \rightarrow Nb_2O_5 + 2HF$$

EXAMPLE 4

A quantity of $NbO_2F$ that had been produced at 232° C. and which contained 62.1% Nb was crushed to 8 mesh by down and blended with aluminum powder, iron powder, lime and sodium chlorate. Three small scale reactions were made varying the amount of aluminum from 90% to 110% by weight of the amount stoichiometrically required to react with the $CbO_2F$ and the sodium chlorate. These results are given in Table III.

TABLE III
SMALL-SCALE ALUMINO-THERMIC REDUCTIONS

| Run No. | 1 | 2 | 3 |
|---|---|---|---|
| Wt. Reagents, grams | | | |
| $NbO_2F$ | 980 | 980 | 980 |
| Iron Powder | 330 | 330 | 330 |
| Aluminum Powder | 291 | 321 | 351 |
| Sodium Chlorate | 50 | 50 | 50 |
| Lime, CaO | 170 | 170 | 170 |
| Total | 1821 | 1851 | 1881 |
| % Aluminum Stoichiometry | 90 | 100 | 110 |
| Wt. Alloy, grams | 695 | 686 | 705 |
| Alloy Analysis | | | |
| % Nb | 58.2 | 59.9 | 58.1 |
| % Al | 0.64 | 1.02 | 4.04 |
| ppm $O_2$ | 1470 | 1265 | 750 |
| ppm $N_2$ | 450 | 540 | 470 |

These results indicate that an excess amount of aluminum is not required. The ignition and firing proceeded smoothly with very little splashing. Due to the small scale of the reactions, the molten charge cooled rapidly precluding complete metal collection. This phenomenon is typical of all small scale thermite reactions. Excellent slag-metal separation was observed.

EXAMPLE 5

A second set of experiments was designed to determine if lime was necessary for the reaction. The same $NbO_2F$ was used as the previous set of experiments of Example 4 and aluminum stoichiometry was maintained at 100%. These results are shown in Table IV.

TABLE IV
CaO-FREE THERMITE REDUCTIONS OF NbO₂F

| Charge, Grams | 1 | 2 | 3 |
| --- | --- | --- | --- |
| NbO₂F | 980 | 980 | 980 |
| Fe Powder | 330 | 330 | 330 |
| Al Powder | 296 | 321 | 331 |
| NaClO₃ | 0 | 50 | 70 |
| Total | 1606 | 1681 | 1711 |
| Slag Condition | Thick | Thick | Thick |
| Firing Time, Seconds | 75 | 40 | 30 |
| Firing Conditions | Very Smoky | Very Smoky | Very Smoky |
| Metal Collection | None | None | None |

Conclusions drawn from this set of experiments were that during the reaction aluminum fluoride is volatilized and does not furnish a slagging effect. The use of lime in approximately stoichiometric quantity to the fluorine contained in the system is recommended.

EXAMPLE 6

In another set of experiments, the reaction of NbO₂F was compared to Nb₂O₅ on a 63 lb. niobium scale. These results are shown in Table V.

TABLE V
COMPARISON OF NbO₂F AND Nb₂O₅

|  | Mix 1 | Mix 2 |
| --- | --- | --- |
| NbO₂F, lbs. | 100 (63 lb. Cb) | — |
| Nb₂O₅, lbs. | — | 90 (63 lb. Cb) |
| Al Powder | 32 | 38.4 |
| CaO | 17 | 17 |
| NaClO₃ | — | 16 |
| Fe Powder | 26.9 | 26.9 |
| Total, lbs. | 175.9 | 188.3 |
| Wt. Alloy, lbs. | 81.5 | 80.0 |
| % Nb | 66.7 | 67.5 |
| % Nb Recovery | 86.3 | 85.7 |

The results of Table V show that, indeed, NbO₂F can be alumino-thermically reduced to ferro-columbium without a heat booster. Niobium recoveries were comparable with those from Nb₂O₅.

EXAMPLE 7

The process of Example 6 was further scaled up to a 350 lb. niobium contained set of reactions. These results are shown in Table VI.

TABLE VI
COMPARISON OF NbO₂F AND Nb₂O₅ ON A 350 LB. NIOBIUM SCALE

|  | NbO₂F | Nb₂O₅ |
| --- | --- | --- |
| NbO₂F, lbs. | 565 (350 lb. Cb) | — |
| Nb₂O₅ | — | 500 (350 lb. Nb) |
| Fe Powder | 169 | 170 |
| Al Powder | 172 | 193 |
| CaO | 115 | — |
| CaF₂ | — | 100 |
| NaClO₃ | — | 42 |
| Total, lbs. | 1021 | 1005 |
| Wt. Alloy, lbs. | 493 | 490 |
| % Nb | 64.4 | 65.0 |
| % Nb Recovery | 90.7 | 91.0 |

These results of Table VI show comparable recoveries. It will be noted that the Nb₂O₅ required 21 lbs. more aluminum to react with the 42 lbs. NaClO₃ added as a heat booster. The NbO₂F reaction proceeded mildly with reduced fume emission. The slag, weighing 531 lbs., contained 13.6% fluorine for a 92.6% fluorine retention in the slag. The results show that NbO₂F can be used for the preparation of ferro-, nickel-, or chromium-columbium provided lime is added to the mix to react with essentially all of the fluorine introduced in the NbO₂F.

From the foregoing, it will be readily apparent to those skilled in the art that various modifications and changes may be effected without departing from practice of the presently disclosed invention. An example of such a modification would be to introduce iron oxide, chromium oxide or nickel oxide instead of the metallic elements into the mix. Under these conditions aluminum would preferentially reduce the metallic oxides and the resulting metals would be available to alloy with the niobium as the reaction proceeded.

What is claimed is:

1. A process which comprises reducing niobium oxyfluoride in the presence of iron, chromium or nickel with aluminum and recovering the resulting niobium alloys.

2. The process according to claim 1 wherein lime is introduced in the mix in sufficient quantity to react with essentially all of the fluorine contained in the niobium oxyfluoride.

3. The process according to claim 1 wherein oxides of calcium, strontium, barium, magnesium and lithium are added to react with essentially all the fluorine contained in the niobium oxyfluoride.

4. The process according to claim 1 whereby ferro-, nickel- or chromium-niobium are produced by aluminothermic reaction from niobium oxyfluoride without the addition of a thermal or chemical heat booster.

5. The process of claim 1 wherein the niobium oxyfluoride is recovered from a hydrofluoric acid solution which comprises evaporating a niobium-bearing solution to dryness at a finishing temperature of greater than about 150° C., and recovering evaporated hydrofluoric acid by condensation or scrubbing.

6. The process according to claim 5 in which the niobium-bearing solution is first concentrated to 350–700 grams per liter niobium prior to evaporation to dryness.

7. The process according to claim 5 in which the evaporating tray is nickel or a nickel alloy.

8. The process according to claim 5 whereby antimony and silicon are removed from a niobium-bearing fluoride solution emanating from the recovery and purification of niobium by a liquid-liquid extraction.

9. The process according to claim 5 in which the niobium oxyfluoride is subsequently converted to Cb₂O₅ by calcination in the presence of water vapor at a temperature of about 500° C. to 1000° C.

10. The process according to claim 1 wherein iron, chromium, and nickel are present as the oxides thereof.

* * * * *

UNITED STATES PATENT AND TRADEMARK OFFICE
CERTIFICATE OF CORRECTION

PATENT NO. : 4,164,417
DATED : August 14, 1979
INVENTOR(S) : Robert A. Gustison

It is certified that error appears in the above-identified patent and that said Letters Patent are hereby corrected as shown below:

Col. 1, line 59, a paragraph has been omitted, kindly insert as follows:  --DESCRIPTION OF THE DRAWING The figure of drawing illustrates a typical flow sheet in the process for recovering niobium values, the process being particularized in the Examples to follow.--

Col. 3, line 40, the formula is incorrect, "$2AlF_3+3MgO \rightarrow Al_2O_3 \; MgF_2$" should be --$2AlF_3+3MgO \rightarrow Al_2O_3+3MgF_2$--

Col. 4, line 3, "Antimony = 550 ppm(Sb/Nb Basis)" should be --Antimony = 500 ppm(Sb/Nb Basis)--;
line 55, "= 183(Sb/Cb" should be --= 183(Sb/Cb Basis)--

Col. 5, line 1, before "typical", change "a" to --the--;
lines 13 through 40, this "Process Flow Sheet" should be omitted entirely and should be set out as the Figure of Drawing.

Col. 4, line 56, "Si = >100" should read --Si = <100--.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks

Disclaimer 4,164,417.—*Robert Abdon Gustison*, Reading, Pa. PROCESS FOR RECOVERY OF NIOBIUM VALUES FOR USE IN PREPARING NIOBIUM ALLOY PRODUCTS. Patent dated Aug. 14, 1979. Disclaimer filed Dec. 21, 1979, by the assignee, *Kawecki Berylco Industries, Inc.*

Hereby enters this disclaimer to claim 9 of said patent.

[*Official Gazette, March 4, 1980.*]